(12) United States Patent
Tanigawa et al.

(10) Patent No.: US 7,568,545 B2
(45) Date of Patent: Aug. 4, 2009

(54) BRAKE PEDAL APPARATUS FOR AUTOMOBILE

(75) Inventors: Yoshihiko Tanigawa, Atsugi (JP); Tsuyoshi Shimizu, Atsugi (JP); Jun Sato, Tochigi-ken (JP); Kazuo Ogawa, Tochigi-ken (JP)

(73) Assignees: Nissan Motor Co., Ltd., Yokohama-shi (JP); F. Tech Incorporation, Minamisaitama-gun (JP)

(*) Notice: Subject to any disclaimer, the term of this patent is extended or adjusted under 35 U.S.C. 154(b) by 127 days.

(21) Appl. No.: 11/806,262

(22) Filed: May 30, 2007

(65) Prior Publication Data

US 2008/0000709 A1 Jan. 3, 2008

(30) Foreign Application Priority Data

May 31, 2006 (JP) ............................ P2006-151889

(51) Int. Cl.
*B60K 28/10* (2006.01)
*G05G 1/32* (2008.04)

(52) U.S. Cl. ........................................ 180/274; 74/512

(58) Field of Classification Search ................ 180/274, 180/271
See application file for complete search history.

(56) References Cited

U.S. PATENT DOCUMENTS

| | | | | |
|---|---|---|---|---|
| 6,070,488 A * | 6/2000 | Yabusaki et al. | ............... | 74/512 |
| 6,076,422 A * | 6/2000 | Tabata | ........................ | 74/512 |
| 6,481,311 B1 | 11/2002 | Sanagi et al. | | |
| 6,669,249 B1 * | 12/2003 | Huang et al. | ................ | 292/337 |
| 2004/0255714 A1 * | 12/2004 | Jagger et al. | ................... | 74/560 |
| 2005/0103151 A1 | 5/2005 | Yoon | | |
| 2005/0217264 A1 * | 10/2005 | Miyoshi et al. | ............... | 60/554 |
| 2005/0269871 A1 | 12/2005 | Saito | | |

FOREIGN PATENT DOCUMENTS

| | | |
|---|---|---|
| CN | 1616282 A | 5/2005 |
| CN | 1701015 A | 11/2005 |
| EP | 0 803 420 A2 | 10/1997 |
| EP | 1 512 586 A1 | 3/2005 |
| EP | 1 547 886 A2 | 6/2005 |
| EP | 1 557 330 A2 | 7/2005 |
| EP | 1 640 229 A1 | 3/2006 |
| JP | 2001-158335 A | 6/2001 |
| JP | 2003-015756 A | 1/2003 |
| JP | 2003-220934 A | 8/2003 |
| JP | 2006-151168 A | 6/2006 |

* cited by examiner

*Primary Examiner*—John Q. Nguyen
*Assistant Examiner*—Keith Frisby
(74) *Attorney, Agent, or Firm*—Foley & Lardner LLP (57) ABSTRACT

A brake pedal apparatus for an automobile, includes: 1) a pedal bracket fixed to a dash panel; 2) a first link rotatably supported about an axis by the pedal bracket in such a configuration as to operate a push rod; 3) a vehicle body portion positioned rearward of the pedal bracket in a vehicular body; 4) a second link rotatably supported about an axis by the pedal bracket; and 5) an engagement portion disposed in the first link, and configured to securely engages with the second link when an external force caused by a collision is applied to the dash panel, followed by operations below: i) the pedal bracket moves rearward of the vehicular body relative to the vehicle body portion, ii) the second link, thereby, contacts the vehicle body portion, and iii) the first link, thereby, moves relative to the second link.

11 Claims, 5 Drawing Sheets

BRAKE PEDAL APPARATUS FOR AUTOMOBILE

BACKGROUND OF THE INVENTION

1. Field of the Invention

The present invention relates to a brake pedal apparatus for an automobile.

2. Description of the Related Art

When a frontal collision of an automobile occurs and thereby a front portion of the vehicular body is largely deformed towards the rear side of the vehicular body, a lower portion side of a pendant pedal arm (a brake pedal) rotates to the rear side relative to the front portion of the vehicular body, causing a possibility that the lower portion side of the pedal arm may interfere with a driver. Japanese Patent Application Laid-Open No. 2003-220934 (=JP2003220934) discloses an automobile which is provided with a locker in a front portion of a vehicular body for locking a pedal arm so that a lower portion of the pedal arm does not rotate to the rear side relative to the front portion of the vehicular body even when a frontal collision of an automobile occurs and thereby the front portion of the vehicular body is largely deformed towards the rear side of the vehicular body.

In the invention in the JP2003220934, the locker provided in the front portion of the vehicular body locks the pedal arm when the lower portion side of the pedal arm (the brake pedal) rotates to the front side once and moves closer to the front portion of the vehicular body due to deformation of the front portion of the vehicular body at an initial stage of a frontal collision of the automobile.

Incidentally, it is difficult to control deformation of a front portion of a vehicular body when an automobile has a frontal collision, and a deformed state of a front portion of a vehicular body differs depending on a situation or the like of a frontal collision.

Therefore, with a structure where a locker is provided in a front portion of a vehicular body like the invention of the JP2003220934, the position of the locker may be misaligned relative to a brake arm (a brake pedal) depending on a deformed state of a front portion of a vehicular body at a frontal collision of an automobile. Hence, the locker as a mechanism for preventing the brake arm from moving backward, as the case may be, fails to lock the brake arm reliably and unfailingly at the frontal collision of the automobile.

SUMMARY OF THE INVENTION

Therefore, it is an object of the present invention to provide a brake pedal apparatus for an automobile, which apparatus can lock a brake arm reliably and unfailingly at a frontal collision and thereby can prevent a lower portion of the brake arm (5) from rotating to the rear side relative to a front portion of a vehicular body.

According to an aspect of the present invention, there is provided a brake pedal apparatus for an automobile, comprising: 1) a pedal bracket fixed to a dash panel; 2) a first link rotatably supported about an axis by the pedal bracket in such a configuration as to operate a push rod; 3) a vehicle body portion positioned rearward of the pedal bracket in a vehicular body; 4) a second link rotatably supported about an axis by the pedal bracket; and 5) an engagement portion disposed in the first link, and configured to securely engages with the second link when an external force caused by a collision is applied to the dash panel, followed by operations below: i) the pedal bracket moves rearward of the vehicular body relative to the vehicle body portion, ii) the second link, thereby, contacts the vehicle body portion, and iii) the first link, thereby, moves relative to the second link.

The other object(s) and feature(s) of the present invention will become understood from the following description with reference to the accompanying drawings.

DESCRIPTION OF THE PREFERRED EMBODIMENTS

Hereinbelow, the present invention is described based on illustrated embodiments.

For ease of understanding, the following description will contain various directional terms, such as left, right, upper, lower, forward, rearward and the like. However, such terms are to be understood with respect to only a drawing or drawings on which the corresponding part of element is illustrated.

First Embodiment

-Structure-

Figure 1:
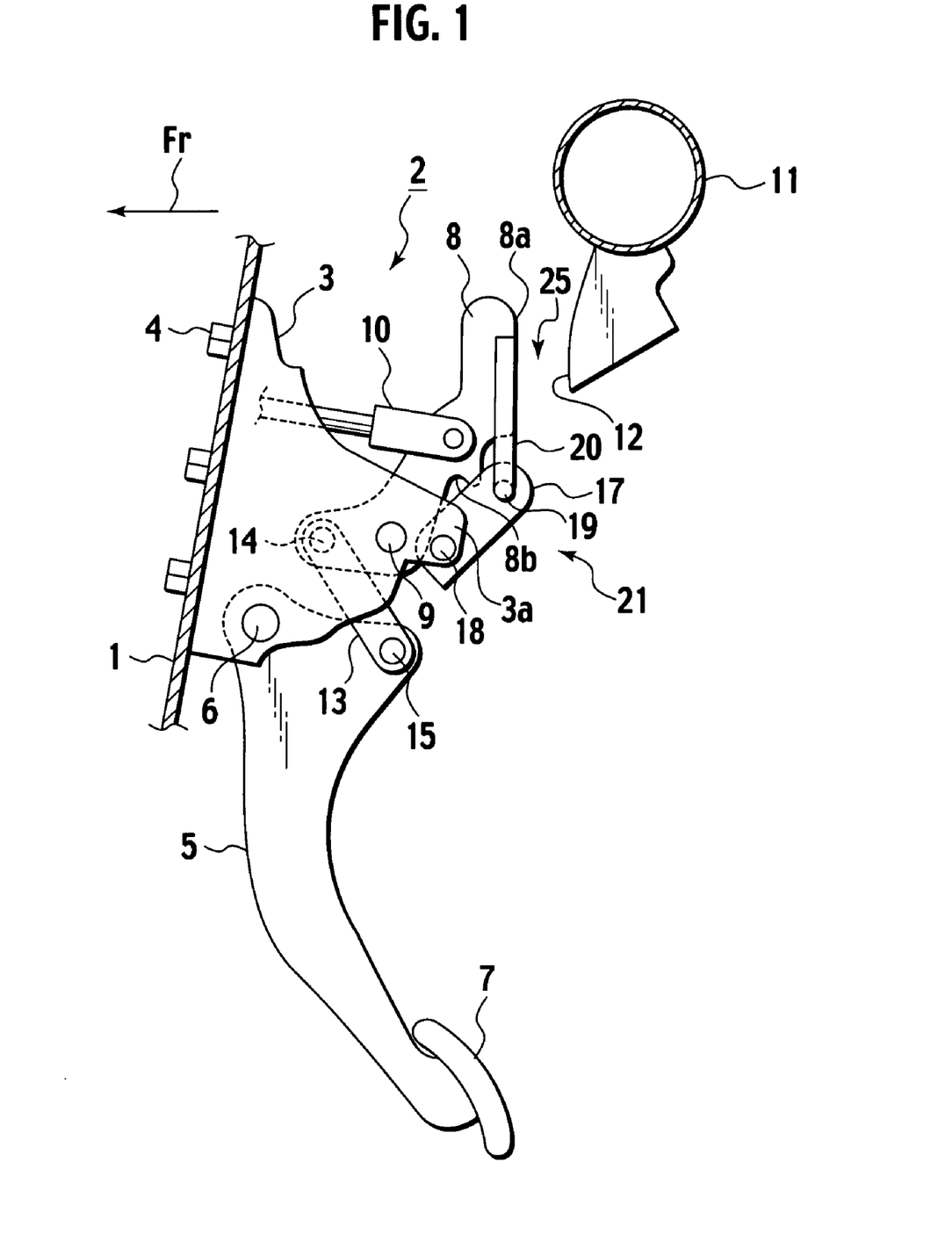
FIG. 1 is a schematic side view showing a brake pedal apparatus for an automobile, according to a first embodiment of the present invention.

FIG. 1 is a schematic side view showing a brake pedal apparatus 2 of an automobile according to a first embodiment of the present invention. Note that, in FIG. 1, the left side (arrow Fr) represents a front side of a vehicular body (not shown).

As shown in FIG. 1, the brake pedal apparatus 2 according to the first embodiment is attached to a dash lower panel 1 which constructs a lower side of a dash panel (not shown) provided in a front portion of a vehicular body. The brake pedal apparatus 2 has a pedal bracket 3 which is open to a vehicle compartment side (the right side in FIG. 1), and a base end side of the pedal bracket 3 is fastened and fixed to the dash lower panel 1 by bolts 4 and nuts (not shown).

At a lower open portion of the pedal bracket 3, a pendant pedal arm 5 is provided. The pedal arm 5 has a spindle 6 (axis) on the upper dash lower panel 1 side, and the spindle 6 is supported about an axis on the both side surfaces of the pedal bracket 3. Therefore, the pedal arm 5 is supported about the spindle 6 rotatably in the front-and-rear direction of the vehicular body.

To a lower end portion of the pedal arm 5, a pedal pad 7 is fixed. Also, between an outer circumference surface of the spindle 6 and the pedal bracket 3, a return spring (not shown) is provided for biasing the pedal arm 5 to the rear side of the vehicular body (the right side in FIG. 1) about the spindle 6, and holds the pedal arm 5 at a position shown in FIG. 1 (non-depressed position) with a stopper (not shown) when the pedal pad 7 is not depressed.

Figure 2:
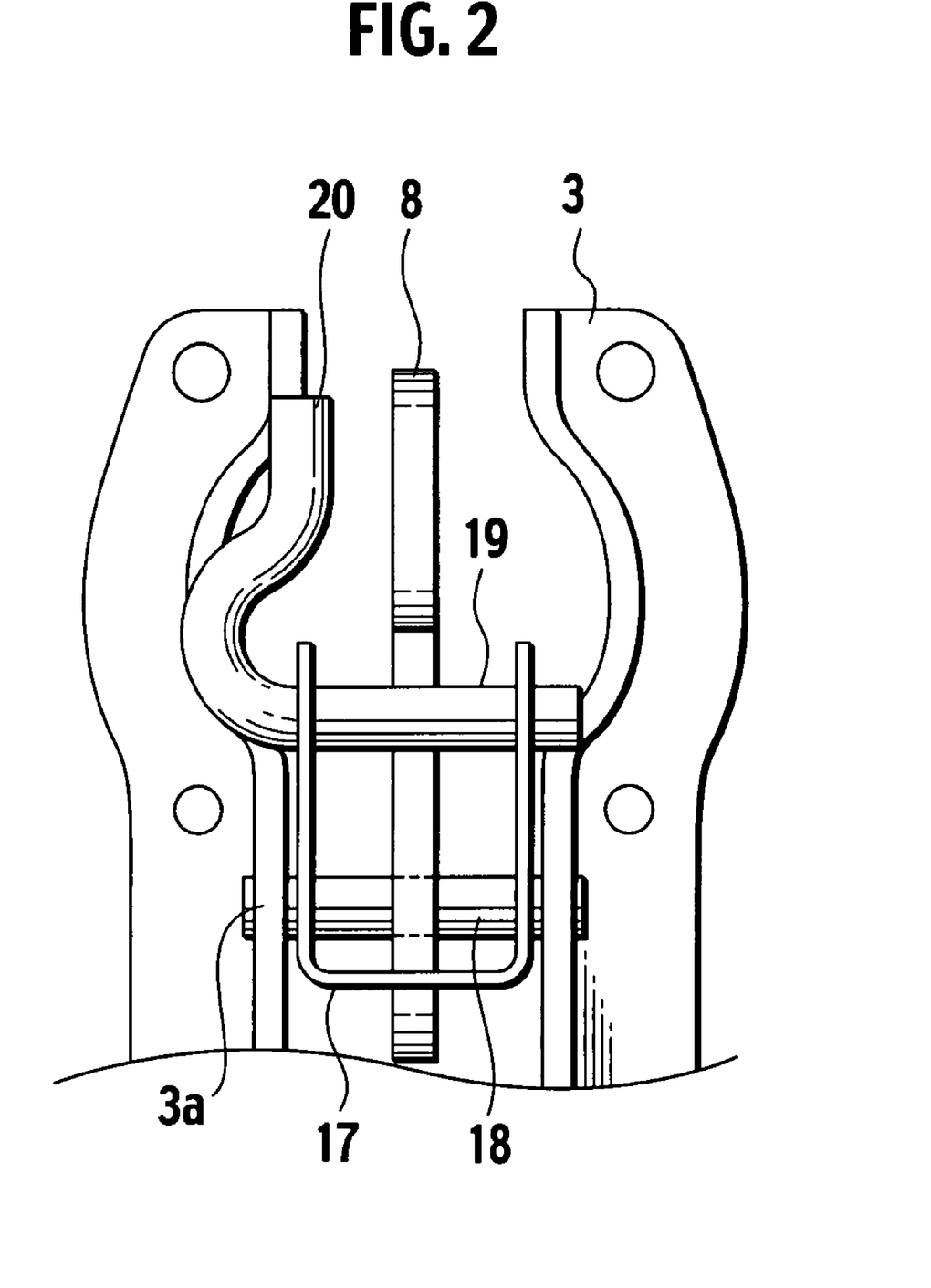
FIG. 2 is a schematic front view showing an essential part of the brake pedal apparatus for the automobile, according to the first embodiment of the present invention.
Figure 3:
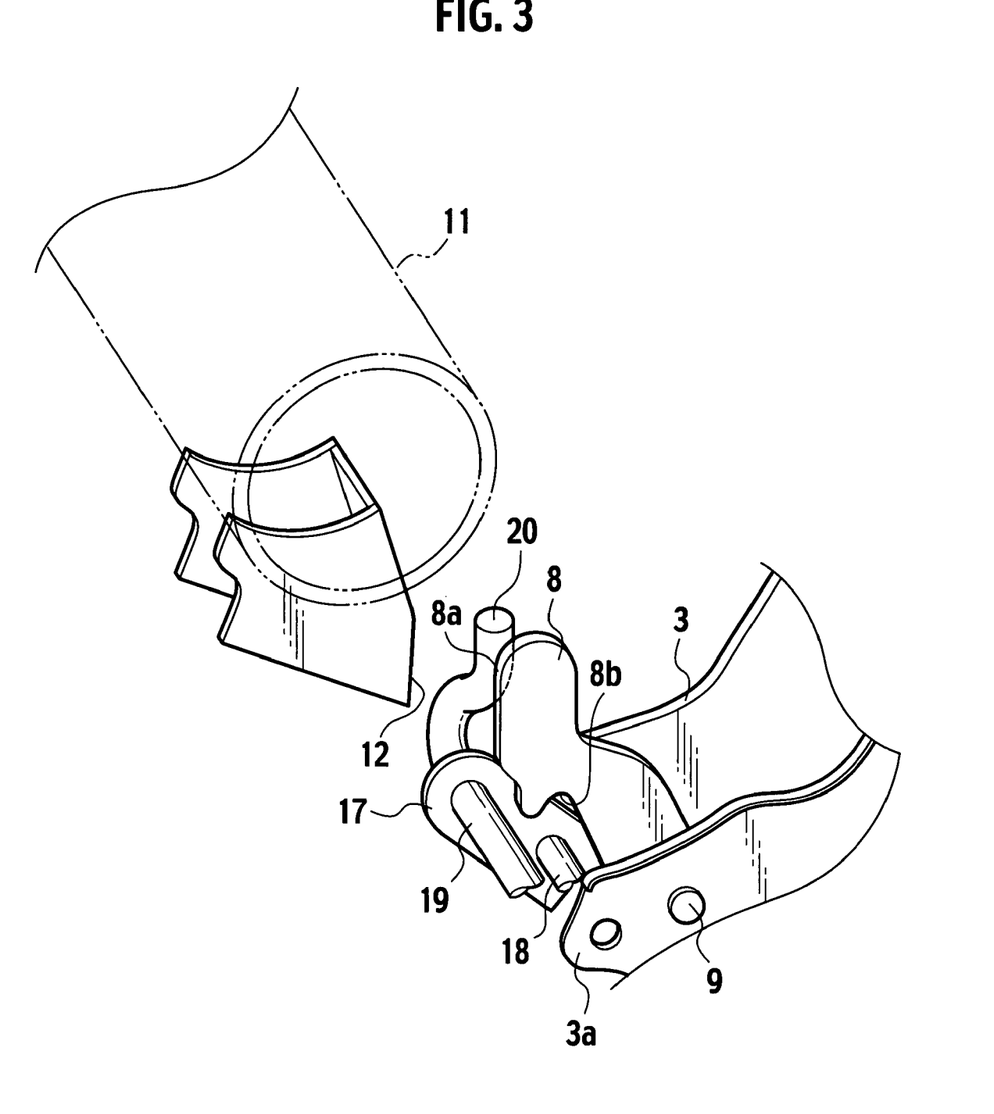
FIG. 3 is a schematic perspective view showing the essential part of the brake pedal apparatus, according to the first embodiment of the present invention.

As shown in FIG. 1, FIG. 2 and FIG. 3, a rotating lever 8 is provided on the open front portion side of the pedal bracket 3 (the opposite side of the dash lower panel 1). A lower portion of the rotating lever 8 has a spindle 9 (axis), and the spindle 9 is supported about an axis on both side surfaces of the pedal bracket 3. Therefore, the rotating lever 8 is supported about the spindle 9 rotatably in the front-and-rear direction of the vehicular body. In an approximately central upper portion of the rotating lever 8, a rear end side of a push rod 10 which transfers to a master cylinder (not shown) a pedal force applied to the pedal pad 7 is supported about an axis. Note that, in FIG. 2 and FIG. 3, the push rod 10 of the rotating lever 8 is not illustrated.

In an upper portion of the rotating lever 8, a contact portion 8a is formed which is located in the vertical direction of the vehicular body when the pedal pad 7 is not depressed. On the vehicle compartment side (the right side in FIG. 1) of the contact portion 8a, a collision impact bracket 12 which is connected to a lower portion of a steering member 11 is placed as a vehicle body portion to face the rotating lever 8. Also, in the vicinity of a center of a side surface of the rotating lever 8 on the vehicle compartment side, a circular arc-shaped engagement portion 8b is formed toward the lower side.

A lower portion of the rotating lever 8 and an upper portion of the pedal arm 5 are connected by a connecting link 13. In other words, an upper portion of the connecting link 13 is supported about an axis via a spindle 14 (axis) by the dash lower panel 1 side of a lower portion of the rotating lever 8, and a lower portion of the connecting link 13 is supported about an axis via a spindle 15 (axis) on the opposite side of the dash lower panel 1 above the pedal arm 5. Therefore, when the pedal arm 5 rotates around the spindle 6, the rotating lever 8 rotates around the spindle 9 due to a swinging movement of the connecting link 13 connected to the rotating lever 8.

Further, between the outer circumference surface of the spindle 9 and the pedal bracket 3, a return spring (not shown) which biases the rotating lever 8 about the spindle 9 to the rear side of the vehicular body (the right side in FIG. 1) is provided, and holds the rotating lever 8 at the position shown in FIG. 1 (the non-depressed position) with a stopper (not shown) when the pedal pad 7 is not depressed.

On an end side of a front portion of the pedal bracket 3 (the opposite side of the dash lower panel 1), a connecting portion 3a is integrally formed, projecting, and a lower portion side of a first regulating lever 17 having a U letter shape in cross section is rotatably supported about an axis by the connecting portion 3a via a spindle 18 (axis). On a side surface on an end side of the first regulating lever 17, a cylindrical engagement member 19 (see FIG. 2 and FIG. 3) to be engaged with the engagement portion 8b of the rotating lever 8 is attached by insertion along the vehicle width direction, and fixed to the first regulating lever 17. Also, a cylindrical second regulating lever 20 is integrally formed on one end side (the left side in FIG. 2) of the engagement member 19, and the second regulating lever 20 is provided along the vertical direction of the vehicular body in such a configuration as to be located approximately in plane (or flush) with the contact portion 8a of the rotating lever 8 when the pedal pad 7 is not depressed. As described above, in the first embodiment, the first regulating lever 17, the engagement member 19, and the second regulating lever 20 construct a regulator 21 for regulating the rotating lever 8 from making such a rotation as to move to the rear side of a vehicular body.

The brake pedal apparatus 2 according to the first embodiment is structured as described above, and, at a normal time (non-collision) without a frontal collision of the automobile (vehicular body), when a driver depresses the pedal pad 7, the pedal arm 5 rotates about the spindle 6 to the front side (the left side in FIG. 1) of the vehicular body.

-Operation (Non-Collision)-

Therefore, the rotating lever 8 rotating about the spindle 9 to the front side of the vehicular body along a swinging movement of the connecting link 13 moves the push rod 10 toward the front side of the vehicular body and the master cylinder (not shown) is operated. Accordingly, braking pressure is transferred to wheel cylinder (not shown) of each wheel via the master cylinder (not shown), to thereby brake the wheels. Note that, at the normal time (the non-collision), since the first regulating lever 17 is supported about an axis (the spindle 18) which is different from the axis (spindle 9, rotational center) of the rotating lever 8, the first regulating lever 17 does not rotate, and stops at the position shown in FIG. 1.

-Operation (Frontal Collision)-

Figure 4A:
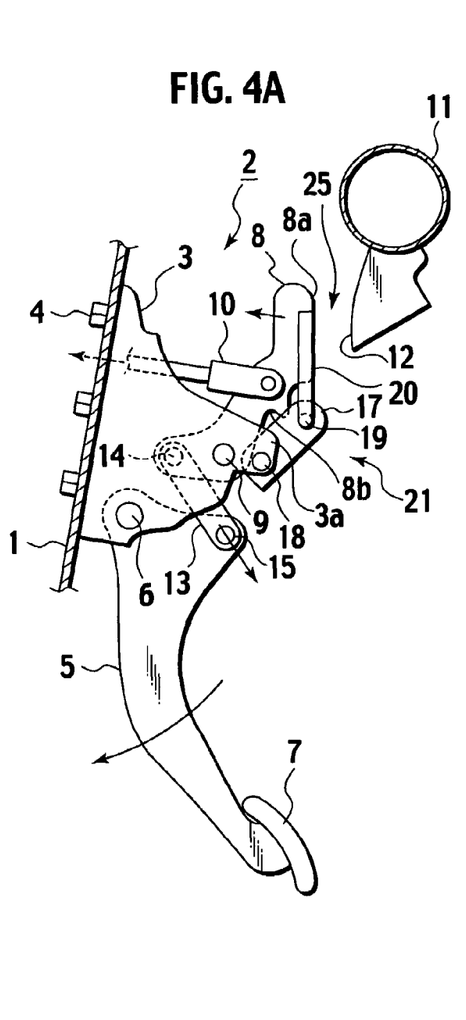
FIG. 4A is a schematic side view showing a state of the brake pedal apparatus according to first embodiment at normal time (non-collision)
Figure 4B:
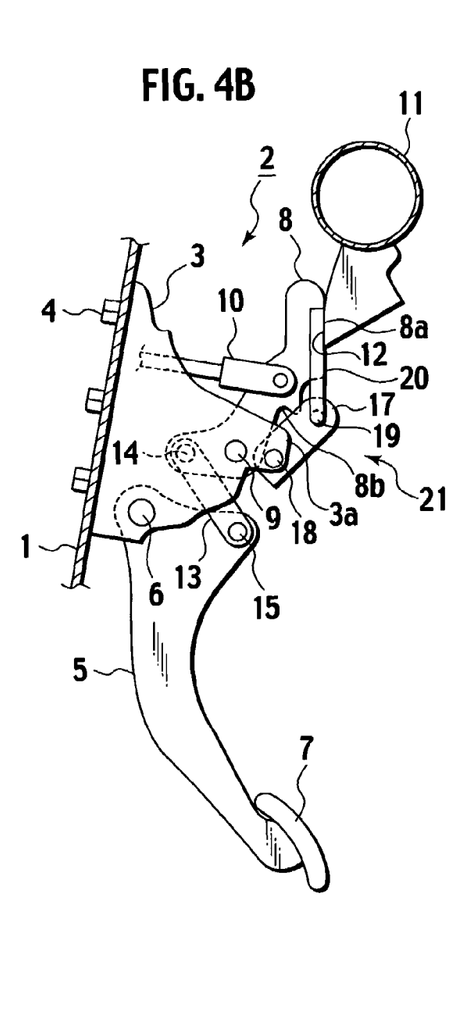
FIG. 4B is a schematic side view showing a state of the brake pedal apparatus at an initial stage of a frontal collision.
Figure 4C:
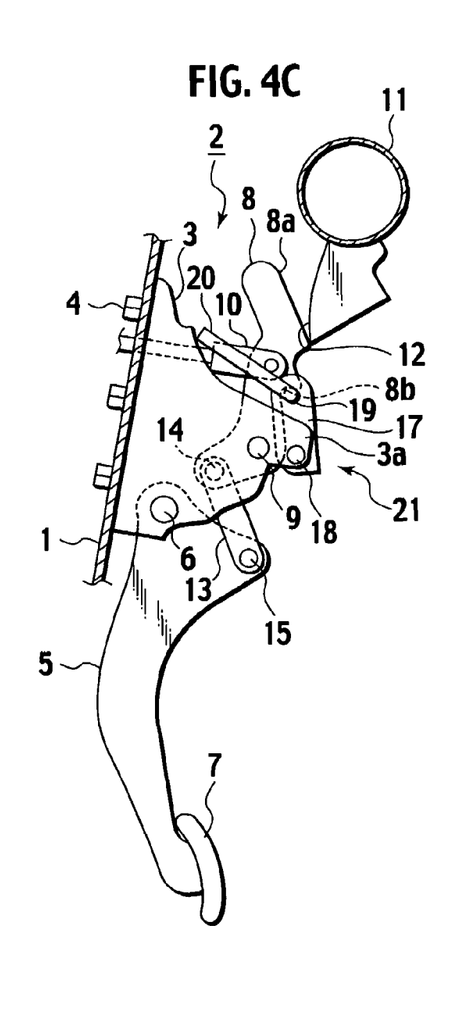
FIG. 4C is a schematic side view showing a state of the brake pedal apparatus from an intermediate stage to a late stage of the frontal collision.

Next, operations of the brake pedal apparatus 2 when a frontal collision of the automobile (the vehicular body) occurs are described referring to FIG. 4A, FIG. 4B and FIG. 4C.

FIG. 4A shows a state at the normal time (the non-collision) (same as FIG. 1). When a frontal collision of the automobile occurs from this state such that an external force is applied to a front portion of the vehicular body, the front portion of the vehicular body is crushed and thereby the dash lower panel 1 moves rearward into the vehicle compartment side. Due to this, as shown in FIG. 4B, the pedal bracket 3 moves rearward together with the dash lower panel 1 at an initial stage of the frontal collision, and thereby the contact portion 8a (of the rotating lever 8) and the second regulating lever 20 collide with the collision impact bracket 12 which is connected to a lower portion of the steering member 11.

Therefore, a force toward the front side of the vehicular body (the left side in FIG. 4B) acts on the second regulating lever 20 due to a reaction caused by the second regulating lever 20 colliding with the collision impact bracket 12, and, along with this, the first regulating lever 17 integrally connected to the second regulating lever 20 via the engagement member 19 rotates to the front side of the vehicular body about the spindle 18. At this time, the rotating lever 8 also rotates to the front side of the vehicular body due to a reaction when colliding with the collision impact bracket 12. Thereafter, as shown in FIG. 4C, from an intermediate stage to a late stage of the frontal collision, the engagement member 19 is slidably engaged with the engagement portion 8b of the rotating lever 8, thus regulating the rotating lever 8 from making such a rotation as to move to the rear side of the vehicular body.

At this time, along with the rotation of the rotating lever 8 toward the front side of the vehicular body, the pedal arm 5 connected to the rotating lever 8 via the connecting link 13 also rotates slightly to the front side of the vehicular body.

Therefore, as shown in FIG. 4C, at the late stage of the frontal collision, even when a force moving the dash lower panel 1 (the pedal bracket 3) further rearward into the vehicle compartment side acts and thereby the contact portion 8a of the rotating lever 8 tries to slide on the surface of the collision impact bracket 12 and rotate to the front side of the vehicular body, the lower portion side of the pedal arm 5 can be prevented from moving rearward. The above preventing is attributable to the engagement member 19 so engaged with the engagement portion 8b (of the rotating lever 8) as to regulate the rotating lever 8 from making such a rotation as to move to the rear side of the vehicular body, as described above.

As described above, with the brake pedal apparatus 2 according to the first embodiment, when a frontal collision of an automobile occurs such that the external force is applied to a front portion of the vehicular body due to the collision, the rotating lever 8 which is connected to the pedal arm 5 through the connecting link 13 is so locked (regulated) as not to rotate to the rear side of the vehicular body. Therefore, in a late stage of the frontal collision, a lower portion side of the pedal arm 5 can be prevented from moving rearward.

Moreover, the regulator 21 (the first regulating lever 17, the engagement member 19, and the second regulating lever 20) for regulating the rotating lever 8 from making such a rotation as to move to the rear side of the vehicular body is placed in the pedal bracket 3 by the spindle 18. Hence, even when the dash lower panel 1 (the pedal bracket 3) is moved rearward into the vehicle compartment side when a frontal collision occurs, the rotating lever 8 is assuredly regulated from making such a rotation as to move to the rear side of the vehicular body. The above assured regulating of the rotating lever 8 can be implemented without changing the position of the rotating lever 8 relative to the regulator 21 (the first regulating lever 17, the engagement member 19, and the second regulating lever 20).

Furthermore, since the rotational center (spindle 9) for the rotating lever 8 and the rotational center (spindle 18) for the first regulating lever 17 are at different locations, it becomes easy to set the first regulating lever 17 to an arbitrary position relative to the rotating lever 8, thus arbitrarily setting an engagement position of engaging the engagement portion 8b with the engagement member 19. With this, it becomes possible to control an input load to the engagement position (the regulating position) of the rotating lever 8 at a frontal collision.

Yet further, because the regulator 21 (the first regulating lever 17, the engagement member 19, and the second regulating lever 20) does not operate at all during a normal braking operation where a driver depresses the pedal pad 7 and thereby rotates the pedal arm 5 to the front side of the vehicular body, the regulator 21 does not affect the normal braking operation.

Second Embodiment

-Structure-

Figure 5A:
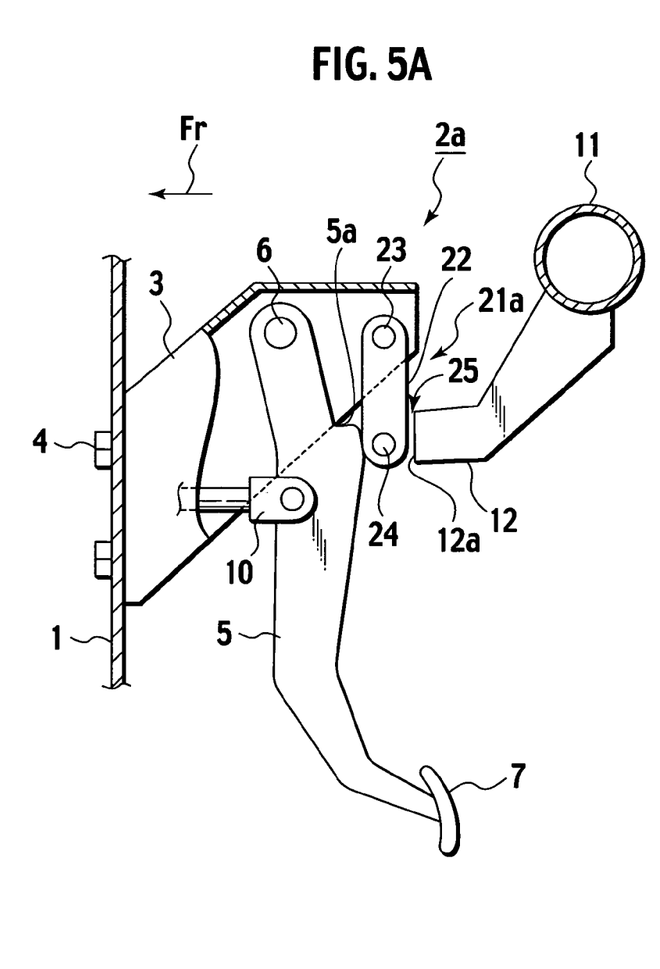
FIG. 5A is a schematic side view showing a brake pedal apparatus for an automobile according to second embodiment of the present invention.

FIG. 5A is a schematic side view showing a brake pedal apparatus 2a of the automobile according to a second embodiment of the present invention. Note that reference numerals with the same functions as those of the brake pedal apparatus 2a of first embodiment illustrated in FIG. 1 are described with the same reference numerals. In FIG. 5A, the left side (arrow Fr) represents a front side of a vehicular body.

As shown in FIG. 5A, the brake pedal apparatus 2a according to the second embodiment is attached to a dash lower panel 1 which constructs a lower side of a dash panel (not shown) provided in a front portion of a vehicular body. The brake pedal apparatus 2a has a pedal bracket 3 open on a vehicle compartment side (the right side of FIG. 5A), and a base end side of the pedal bracket 3 is fastened and fixed to the dash lower panel 1 by bolts 4 and nuts (not shown).

At a lower open portion of the pedal bracket 3, a pendant pedal arm 5 is provided. The pedal arm 5 has a spindle 6 on the upper dash lower panel 1 side, and the spindle 6 is supported about an axis on the both side surfaces of the pedal bracket 3. Therefore, the pedal arm 5 is supported about the spindle 6 rotatably in the front-and-rear direction of the vehicular body.

To a lower end portion of the pedal arm 5, a pedal pad 7 is fixed. Also, between an outer circumference surface of the spindle 6 and the pedal bracket 3, a return spring (not shown) is provided for biasing the pedal arm 5 to the rear side of the vehicular body (the right side in FIG. 3) about the spindle 6, and holds the pedal arm 5 at a position shown in FIG. 5A (the non-depressed position) with a stopper (not shown) when the pedal pad 7 is not depressed.

In an approximately central upper portion of the pedal arm 5, a rear end side of a push rod 10 which transfers to a master cylinder (not shown) a pedal force applied to the pedal pad 7 is supported about an axis.

On an end side surface of a front portion of the pedal bracket 3 (the opposite side of the dash lower panel 1), an upper portion side of a regulating lever 22 (second link) is rotatably supported about an axis via a spindle 23 (axis). On a side surface of a lower end side of the regulating lever 22, a cylindrical engagement member 24 (second link) to be engaged with an engagement portion 5a formed in the pedal arm 5 is fixed along the vehicle width direction. As described above, in the second embodiment, the regulating lever 22 and the engagement member 24 construct a regulator 21a for regulating the pedal arm 5 from making such a rotation as to move to the rear side of the vehicular body.

Further, on the vehicle compartment side (the right side in FIG. 5A) of the regulating lever 22, a collision impact bracket 12 connected to a lower portion of a steering member 11 is placed to face the regulating lever 22, and an end surface 12a of the collision impact bracket 12 faces the engagement member 24 with a predetermined space 25 between the end surface 12a and the engagement member 24.

-Operation (Frontal Collision)-

Figure 5B:
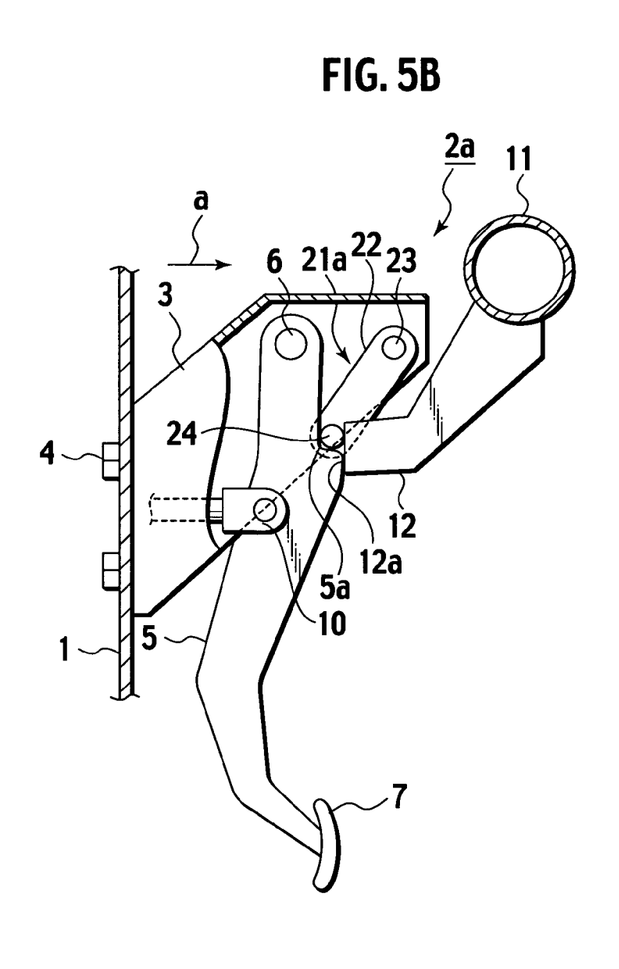
FIG. 5B is a schematic side view showing a state of the brake pedal apparatus after a frontal collision.

Next, operations of the brake pedal apparatus 2a when a frontal collision of the automobile (the vehicle) occurs are described referring to FIG. 5A and FIG. 5B.

FIG. 5A shows a non-depressed state at normal time (the state before the frontal collision), and, when the frontal collision of the vehicle occurs from the non-depressed state such that an external force is applied to a front portion of the vehicular body due to the collision, the front portion of the vehicular body is crushed and thereby the dash lower panel 1 moves rearward into the vehicle compartment side. Due to this, as shown in FIG. 5B, the pedal bracket 3 also moves rearward (see arrow a) integrally with the dash lower panel 1. At this time, the pedal arm 5 rotates once to the front side of the vehicular body about the spindle 6 due to an impact of the frontal collision.

Thereafter, as shown in FIG. 5B, along with the rearward movement of the pedal bracket 3, the engagement member 24 collides with the collision impact bracket 12, to thereby rotate the regulating lever 22 to the front side of the vehicular body about the spindle 23. Thereby, the engagement member 24 is so pressed by the collision impact bracket 12 as to be engaged with the engagement portion 5a of the pedal arm 5, thus regulating a lower portion side of the pedal arm 5 from making such a rotation as to move to the rear side of the vehicular body.

Therefore, at a late stage of the frontal collision, even when a force moving the dash lower panel 1 (the pedal bracket 3) further rearward into the vehicle compartment side acts and thereby the lower portion of the pedal arm 5 tries to rotate to the rear side of the vehicular body, the lower portion side of the pedal arm 5 can be regulated from making such a rotation as to move to the rear side of the vehicular body. The above regulating is attributable to the engagement member 24 engaged with the engagement portion 5a of the pedal arm 5.

As described above, with the brake pedal apparatus 2a according to the second embodiment, when the frontal collision of the automobile occurs such that the external force is applied to a front portion of the vehicular body due to the collision, the engagement member 24 is engaged with the engagement portion 5a of the pedal arm 5 and thereby the lower portion side of the pedal arm 5 is so locked (regulated) as not rotate to the rear side of the vehicular body. Therefore, the lower portion side of the pedal arm 5 can be prevented from moving rearward.

Further, the regulator 21a (the regulating lever 22 and the engagement member 24) for regulating the pedal arm 5 from making such a rotation as to move to the rear side of the vehicular body is placed in the pedal bracket 3. Hence, even when the dash lower panel 1 (the pedal bracket 3) is moved rearward into the vehicle compartment side when the frontal collision occurs, the engagement member 24 is assuredly engaged with the engagement portion 5a of the pedal arm 5 at the frontal collision. The above assured engaging can be implemented without changing the position of the engagement portion 5a (of the pedal arm 5) relative to the regulator 21a (the regulating lever 22, and the engagement member 24).

Furthermore, since the regulator 21a (the regulating lever 22, and the engagement member 24) does not operate at all during a normal braking operation where a driver depresses the pedal pad 7 and thereby rotates the pedal arm 5 to the front side of the vehicular body, the regulator 21a does not affect the normal braking operation.

Although the present invention has been described above by reference to two embodiments, the present invention is not limited to the two embodiments described above. Modifications and variations of the two embodiments described above will occur to those skilled in the art, in light of the above teachings.

This application is based on a prior Japanese Patent Application No. P2006-151889 (filed on May 31, 2006 in Japan). The entire contents of the Japanese Patent Application No. P2006-151889 from which priority is claimed are incorporated herein by reference, in order to take some protection against translation errors or omitted portions.

The scope of the present invention is defined with reference to the following claims.

What is claimed is:

1. A brake pedal apparatus for an automobile, comprising:
a pedal bracket fixed to a dash panel;
a first link rotatably supported about a first axis by the pedal bracket in such a configuration as to operate a push rod;
a vehicle body portion positioned rearward of the pedal bracket in a vehicular body;
a second link rotatably supported about a second axis by the pedal bracket; and
an engagement portion disposed in the first link, and
wherein, when an external force caused by a collision is applied to the dash panel, the brake pedal apparatus is configured to:
allow the pedal bracket to move rearward of the vehicular body relative to the vehicle body portion,
cause the second link to contact the vehicle body portion as a result of the pedal bracket moving rearward,
cause the first link to move relative to the second link, and
cause the engagement portion to go from being disengaged to securely engaged with the second link as a result of the first link moving relative to the second link, wherein the first link further includes a rotating lever connected to a pedal arm via a connecting link,
wherein in an upper portion of the rotating lever, a contact portion is formed which is located in a substantially vertical direction of the vehicular body when a pedal pad fixed to the first link is not depressed, and
wherein the engagement portion is substantially a concave shaped part open toward a lower side of the rotating lever.

2. The brake pedal apparatus for the automobile according to claim 1, wherein the second link includes:
a first regulating lever configured to be rotatably supported about the second axis by the pedal bracket, and
an engagement member fixed to the first regulating lever in a vehicle width direction and configured to be engaged with the engagement portion.

3. The brake pedal apparatus for the automobile according to claim 2, wherein the first regulating lever is rotatably supported about the second axis rearward of the pedal bracket, the second axis being different in position from a rotational center of the rotating lever.

4. The brake pedal apparatus for the automobile according to claim 2, further comprising:
a second regulating lever configured to face the vehicle body portion located more rearward in the vehicular body than the first regulating lever, the second regulating lever and the vehicle body portion defining therebetween a predetermined space, and the second regulating lever being fixed on an upper portion side of the first regulating lever,
wherein when the external force is applied to a front portion of the vehicular body and thereby the pedal bracket is moved rearward of the vehicular body, the second regulating lever moves frontward of the vehicular body due to a reaction to a collision with the vehicle body portion, to thereby rotate the first regulating lever frontward of the vehicular body.

5. The brake pedal apparatus for the automobile according to claim 1,
wherein the engagement portion is substantially a circular arc formed toward the lower side of the rotating lever.

6. The brake pedal apparatus for the automobile according to claim 5, wherein a lower portion of the rotating lever and an upper portion of the pedal arm are connected by the connecting link, such that an upper portion of the connecting link is supported about a third axis by a dash panel side of the lower portion of the rotating lever and that a lower portion of the connecting link is supported about a fourth axis on an opposite side of the dash panel above the pedal arm, and
wherein when the pedal arm rotates around a fifth axis thereof, the rotating lever rotates around the first axis thereof due to a swinging movement of the connecting link connected to the rotating lever.

7. The brake pedal apparatus for the automobile according to claim 6, wherein, on an end side of the pedal bracket, a connecting portion is integrally formed, and projecting, and
wherein a lower portion side of the first regulating lever of the second link has a U shape in cross section that is rotatably supported about the second axis by the connecting portion.

8. The brake pedal apparatus for the automobile according to claim 7, wherein, on a side surface on an end side of the first regulating lever, the engagement member which is substantially cylindrical and configured to be engaged with the engagement portion of the rotating lever is attached by insertion along the vehicle width direction.

9. The brake pedal apparatus for the automobile according to claim 8, wherein the second regulating lever which is substantially cylindrical is integrally formed on one end side of the engagement member, and
wherein the second regulating lever is provided along the substantially vertical direction of the vehicular body in such a configuration as to be located approximately in plane with the contact portion of the rotating lever when the pedal pad is not depressed.

10. The brake pedal apparatus for the automobile according to claim 9, wherein the first regulating lever, the engagement member, and the second regulating lever construct a regulator for regulating the rotating lever from making such a rotation as to move to a rear side of the vehicular body.

11. The brake pedal apparatus for the automobile according to claim 4, wherein the first regulating lever is a member different from the second regulating lever.

* * * * *